US008995345B2

(12) United States Patent
Stogner et al.

(10) Patent No.: US 8,995,345 B2
(45) Date of Patent: Mar. 31, 2015

(54) METHOD AND APPARATUS FOR CONFIRMING DELIVERY IN A MULTI-CHANNEL RECEIVING APPARATUS

(71) Applicant: Motorola Solutions, Inc., Schaumburg, IL (US)

(72) Inventors: Darrell J. Stogner, Plantation, FL (US); David R. Mills, West Palm Beach, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 139 days.

(21) Appl. No.: 13/687,495

(22) Filed: Nov. 28, 2012

(65) Prior Publication Data

US 2014/0146683 A1    May 29, 2014

(51) Int. Cl.
*H04W 72/12* (2009.01)
*H04L 29/06* (2006.01)
*H04W 88/06* (2009.01)

(52) U.S. Cl.
CPC ........... *H04L 29/06* (2013.01); *H04W 72/1215* (2013.01); *H04W 88/06* (2013.01)
USPC ........................................................ 370/328

(58) Field of Classification Search
CPC ... H04W 72/1205; H04W 88/06; H04L 29/06
USPC ................................................. 370/328, 338
See application file for complete search history.

(56) References Cited

U.S. PATENT DOCUMENTS 5,644,260 A    7/1997  DaSilva et al.
5,694,093 A   12/1997  DaSilva et al.
6,122,271 A    9/2000  McDonald et al.
6,157,616 A   12/2000  Whitehead
6,421,397 B1   7/2002  McVey
(Continued)

FOREIGN PATENT DOCUMENTS

EP         2068452 A2     6/2009
WO     2005083944 A1     9/2005
WO     2008070777 A2     6/2008

OTHER PUBLICATIONS

International Search Report for International Patent Application No. PCT/US2012/065871 mailed Apr. 24, 2013.
(Continued)

*Primary Examiner* — Paul H Masur
(74) *Attorney, Agent, or Firm* — Steven A. May; Daniel R. Bestor (57) ABSTRACT

An apparatus for simultaneously receiving incoming messages on at least two channels in a multi-channel device, wherein a first incoming message is received on a first channel of the at least two channels according to a first protocol. Responsive to receiving the first incoming message, outgoing messages are transmitted on the first channel while the incoming messages are simultaneously received on a second channel. The outgoing messages to be sent according to the first protocol are queued in a transmitter. The transmitter also monitors at least one data stack that is used for transmitting messages according to a second protocol for transmit opportunities. Responsive to detecting a transmit opportunity, the transmitter transmits an optimal number of the outgoing messages within the duration of the transmit opportunity. The outgoing messages are transmitted on the first channel without affecting incoming messages received on the second channel.

19 Claims, 4 Drawing Sheets

(56) References Cited

U.S. PATENT DOCUMENTS

| | | |
|---|---|---|
| 6,574,286 B2 | 6/2003 | McVey |
| 6,611,536 B1 | 8/2003 | Ahmed |
| 6,618,096 B1 | 9/2003 | Stapleton |
| 6,714,259 B2 | 3/2004 | Kim |
| 6,721,398 B1 | 4/2004 | Pitcher |
| 6,798,844 B2 | 9/2004 | Ratto |
| 6,807,528 B1 | 10/2004 | Truman et al. |
| 6,819,706 B1 | 11/2004 | Lim |
| 7,499,441 B2 | 3/2009 | Wiatrowski et al. |
| 7,689,187 B2 | 3/2010 | Galan |
| 8,014,385 B2 | 9/2011 | Kang et al. |
| 8,135,425 B1 | 3/2012 | Banik et al. |
| 2003/0056221 A1 | 3/2003 | Zhang et al. |
| 2004/0142723 A1 | 7/2004 | Shippee |
| 2004/0225494 A1 | 11/2004 | Mayginnes et al. |
| 2006/0291428 A1 | 12/2006 | Filipovic |
| 2007/0093227 A1 | 4/2007 | Lieback et al. |
| 2007/0189419 A1 | 8/2007 | Filipovic |
| 2007/0281617 A1* | 12/2007 | Meylan et al. ............. 455/41.2 |
| 2008/0233875 A1* | 9/2008 | Desai et al. ............... 455/41.2 |
| 2009/0180451 A1* | 7/2009 | Alpert et al. .............. 370/338 |
| 2010/0048157 A1 | 2/2010 | Carrera |
| 2010/0165973 A1* | 7/2010 | Su et al. .................... 370/345 |
| 2010/0194582 A1 | 8/2010 | Petite |
| 2011/0097998 A1* | 4/2011 | Ko et al. ................... 455/41.2 |
| 2011/0274080 A1* | 11/2011 | Ko et al. ................... 370/329 |
| 2012/0046000 A1* | 2/2012 | Gao et al. .................... 455/73 |
| 2012/0129480 A1 | 5/2012 | Ruelke et al. |
| 2012/0155295 A1 | 6/2012 | Trainin |
| 2012/0163309 A1 | 6/2012 | Ma et al. |
| 2012/0163508 A1 | 6/2012 | Kuffner et al. |
| 2012/0164948 A1* | 6/2012 | Narasimha et al. ........ 455/63.1 |
| 2012/0276938 A1 | 11/2012 | Wagholikar et al. |
| 2013/0114583 A1* | 5/2013 | Park et al. ................. 370/338 |
| 2013/0156134 A1 | 6/2013 | Galan et al. |
| 2013/0170439 A1* | 7/2013 | Anderson et al. .......... 370/329 |
| 2013/0242860 A1 | 9/2013 | Kim et al. .................. 370/328 |
| 2013/0343195 A1* | 12/2013 | Nagata ...................... 370/235 |
| 2013/0343236 A1* | 12/2013 | Chen et al. ................. 370/278 |

OTHER PUBLICATIONS

PCT International Search Report Dated Apr. 29, 2014 for Counterpart Application PCT/US2013/070658.

* cited by examiner

METHOD AND APPARATUS FOR CONFIRMING DELIVERY IN A MULTI-CHANNEL RECEIVING APPARATUS

FIELD OF THE DISCLOSURE

The present disclosure relates generally to simultaneously receiving messages on multiple channels in a receiver apparatus, and more particularly, to allowing the receiver apparatus to transmit information on one channel without affecting reception on other channels.

BACKGROUND

Narrowband systems include a number of infrastructure elements for facilitating communications between communication devices. For example, public safety organizations may use specialized communication systems embodied as narrowband radio systems that typically support low-bit-rate digital or analog transmission of audio and/or data streams. An example of such a narrowband network uses an Association of Public Safety Communications Official (APCO) Project 25 (P25) standard in a voice communication system that includes wireless and wired communication devices. Examples of other standards used in systems operating on the narrowband network may include, but are not limited to, Terrestrial Trunked Radio (TETRA), analog FM, Securenet, Digital Mobile Radio (DMR), High Performance Data/High Speed Data (HPS/HSD) Soldier Radio Waveform (SRW), and/or other legacy cellular protocols. The communication devices used in these narrowband systems may be, for example, portable radios for hand held operation, mobile radios for vehicular operation, dispatch consoles and other fixed equipment for console operator positions and wide-area operation, base stations for fixed installations, computer equipment for data communication, or other similar communication entities that communicate with one another via wired and/or wireless networks. Public safety organizations may choose these narrowband systems because they provide improved end-to-end voice quality and efficient group communication, use advanced cryptography, enable centralized logging of calls, and/or are associated with lower delay and higher reliability.

In, for example, a P25 system, a Common Air Interface is used to ensure that communication devices can interoperate at the physical layer and the data link layer. In particular, voice and/or data messages are processed in a transmitting communication device and transmitted over the Common Air Interface to a receiving communication device. Data may be sent with either confirmed delivery or unconfirmed delivery. Confirmed delivery requires that the receiving communication device sends an acknowledgment when the data message is received. After sending a data message with confirmed delivery, if the receiving communication device does not send the acknowledgment, the transmitting radio may then selectively resend the unacknowledged data packets. In some protocols, after sending a data message with confirmed delivery, the receiving radio may send a request for a re-transmission instead of just an acknowledgement. Unconfirmed delivery is used when the transmitting communication device does not require an acknowledgement from the receiving communication device when the receiving communication device receives the data message.

The receiving communication device may be, for example, a multi-channel receiver radio that may simultaneously receive data and/or voice messages on two or more channels. Although the multi-channel receiver radio is configured to receive message on two or more channels, due to the interference from the transmitter, transmitting information on one channel prevents the multi-channel receiver radio from reception on the other channel(s). Therefore, when the multi-channel receiver radio receives a data packet with confirmed delivery, while the radio is sending an acknowledgement receipt for the received data packet on one channel, the radio is prevented from receiving data or voice messages on the other channel(s), even if the channel(s) is receiving real-time data. There are some very expensive hardware-based workarounds involving large and costly duplexers that also solve the interference from the transmitter. However, without these expensive hardware-based workarounds, sending the acknowledgement receipt for the received data packet may prevent the radio from receiving, for example, real-time voice message(s).

Accordingly, there is a need for a method for simultaneously receiving messages on multiple channels in a receiver apparatus, wherein the receiver apparatus is configured to transmit information on one channel without affecting reception on the other channel(s).

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for simultaneously receiving incoming messages on at least two channels in a multi-channel device, wherein a first incoming message is received on a first channel of the at least two channels according to a first protocol. Responsive to receiving the first incoming message, outgoing messages are transmitted on the first channel while the incoming messages are simultaneously received on a second channel of the at least two channels. The outgoing messages to be sent according to the first protocol are queued in a transmitter. The transmitter also monitors at least one data stack that is used for transmitting outgoing messages according to a second protocol for transmit opportunities. Responsive to detecting a transmit opportunity, the transmitter transmits an optimal number of the outgoing messages within the duration of the transmit opportunity. The outgoing messages are transmitted on the first channel without affecting incoming messages received on the second channel.

Figure 1:
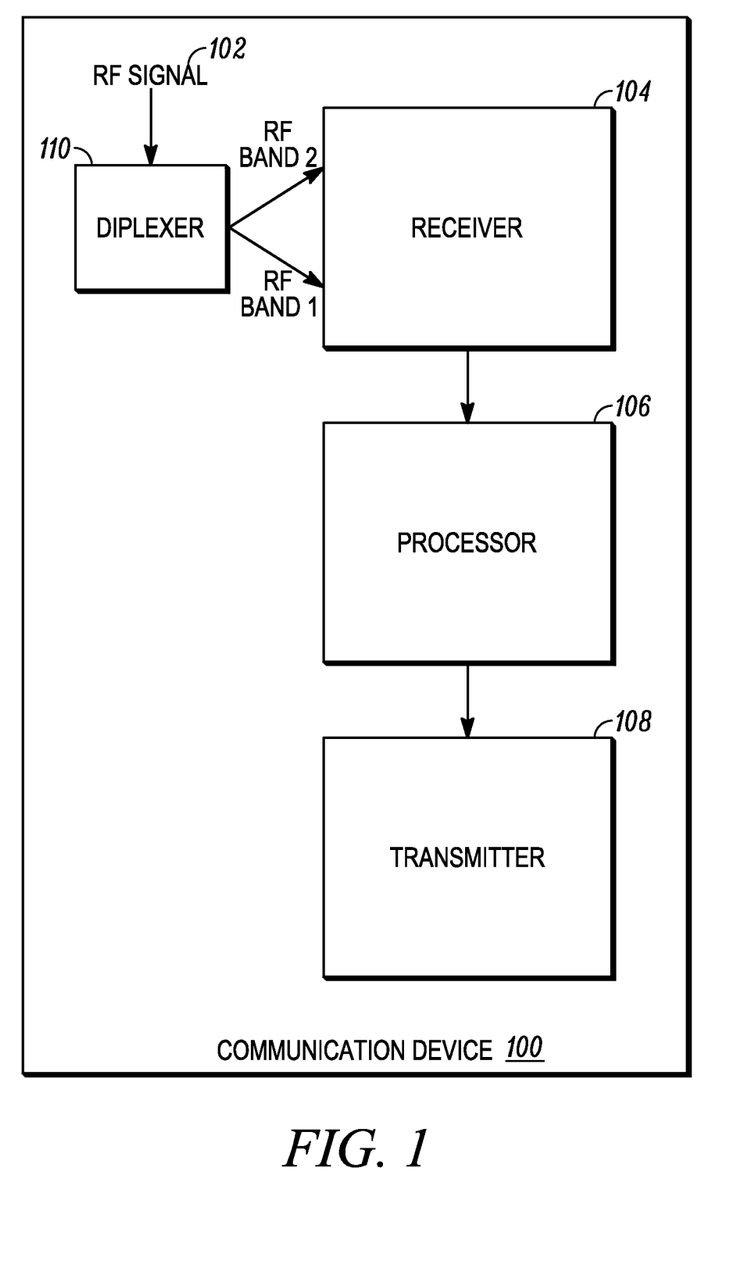
FIG. 1 is a block diagram of a communication device used in accordance with some embodiments.

FIG. 1 is a block diagram of a communication device 100 operating in accordance with some embodiments. Communication device 100 (also referred to herein as device 100) may be, for example, portable radios for hand held operation, mobile radios for vehicular operation, or other similar communication entities that communicate with one another via wired and/or wireless networks and that are used in public safety, government and enterprise environments. Device 100 may with comply with stringent public safety specifications for government and enterprise customers worldwide, for example, specifications for systems using Terrestrial Trunked Radio (TETRA), Association of Public Safety Communications Officials Project 25 (APCO P25), analog FM, Securenet, Digital Mobile Radio (DMR), High Performance Data/High Speed Data (HPS/HSD) Soldier Radio Waveform (SRW), and/or other legacy cellular protocols.

Device 100 includes a multi-channel receiver 104 for receiving an incoming radio frequency (RF) signal 102 operating over more than one band in the public safety band. RF signal 102 can include any type of information, even uncorrelated information, such as voice and data over the different bands. RF signal 102 may be separated into its constituent RF bands (RF band 1, RF band 2, etc) by a diplexer (110) for simultaneous application to receiver 104. Separated RF input signals may fall within a single common band or different bands as may be incorporated into the public safety spectrum allocation. For example, a first RF signal may be received on a first RF channel modulated with a first information set while a second RF signal is simultaneously received on a second RF channel modulated with a second information set. In one embodiment, the first RF signal being received on the first RF channel may be different from the second RF signal being received on the second RF channel, wherein the first information set is uncorrelated to the second information set, and the protocol for conveying the first information set is independent from, and unrelated to, the protocol for conveying the second information set. In a second embodiment, the first and second RF signals may be the same; however the RF signals may be received on spatially different antennas or by another means that introduces a fixed phase difference or other fixed relationship between the first information set and the second information set, thereby functioning in a diversity receive mode of operation. Receiver 104 may therefore be a multi-band and a multi-protocol receiver that is configured to receive two or more signals that are spectrally located in any given band, wherein each signal is communicated using one of a plurality of protocols.

Device 100 provides for simultaneous multi-mode operation, wherein one channel can simultaneously receive high speed digital information through a data protocol, for example, while the other channel receives mission critical audio on an analog FM signal. For ease of explanation and illustration, the drawings and examples within this application are shown in the form of a dual-channel receiver, however it should be understood that receiver 104 can receive RF signals from more than two channels. Hence, the term multi-channel receiver is intended to encompass two or more channels. Receiver 104 can adopt either a direct conversion receiver topology (DCR) or a dual conversion topology; however, whether DCR or dual conversion, the receiver topology may include band specific receiver front end stages for isolating the desired first and second RF signals as described below. Receiver 104 may also have parallel operations in a processor stage so as to process both the first and second received signals simultaneously.

The received RF signal 102 may be further processed by a processor 106 as may be required to support a particular application. According to APCO P25 protocol, for example, RF signal 102 received by device 100 may include a data message or packet sent with confirmed delivery, thus requiring device 100 to send an acknowledgment receipt when the data message is received. Device 100 includes a transmitter 108 for transmitting the acknowledgement receipt and other information. Using the example where a data message is received with confirmed delivery according to the APCO protocol, transmitter 108 is configured to transmit the acknowledgement receipt, without affecting reception on the other channel(s). In general, transmitter 108 is configured to transmit information on one channel, in accordance with one of a plurality of protocols, without affecting reception on the other channel(s).

Figure 2:
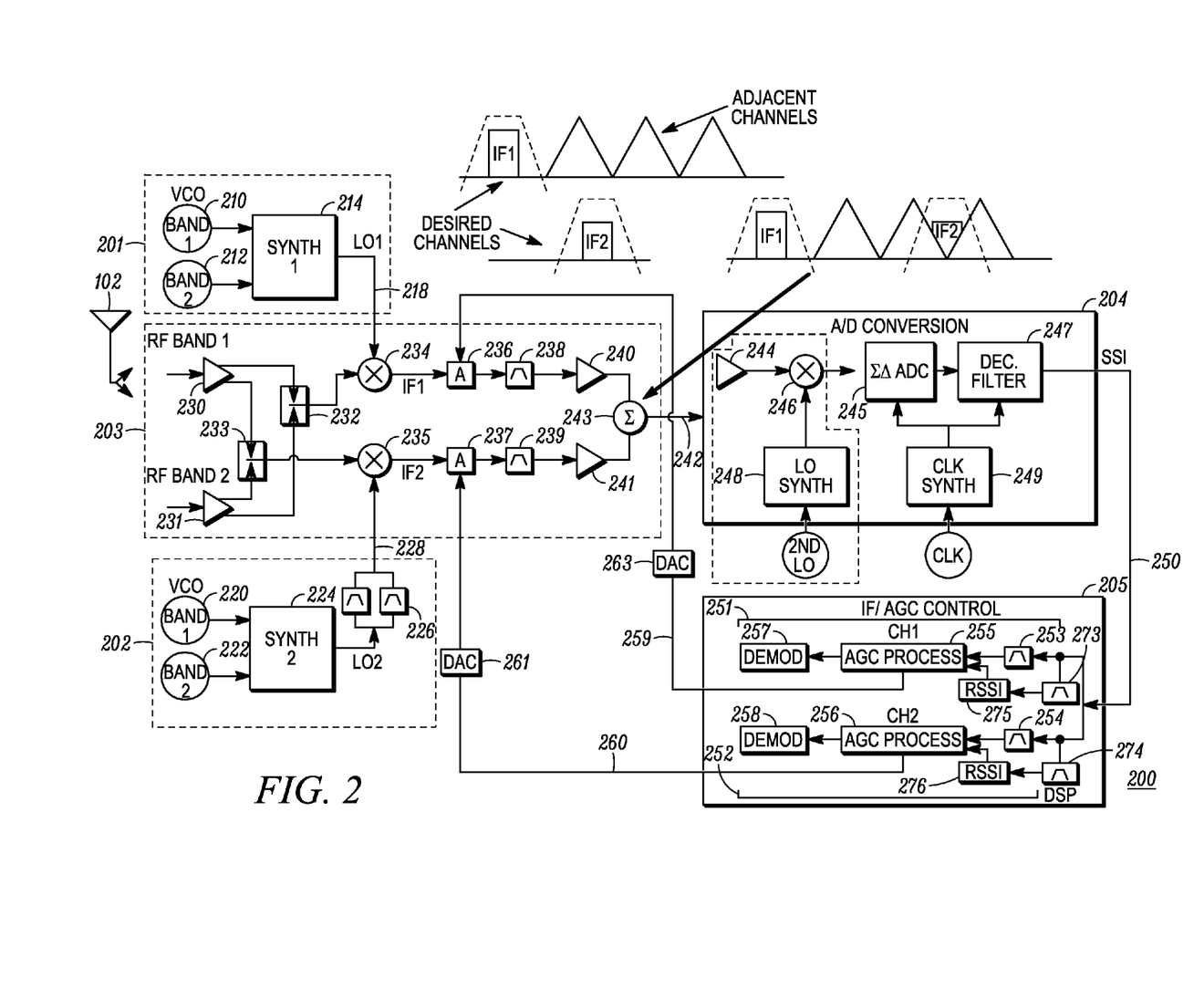
FIG. 2 is a block diagram of a receiver device used in accordance with some embodiments.

In FIG. 2 is a block diagram of receiver 104 used in accordance with some embodiments. Receiver 104 includes a first local oscillator (LO) generator 201 for generating a first injection signal (LO1) 218, a second LO generator 202 for generating a second injection signal (LO2) 228, a simultaneous dual-channel receiver 203, an analog-to-digital converter (ADC) system 204, and an automatic gain (AGC) control 205. AGC control 205 may be a dedicated circuit, or may be incorporated into a digital signal processor block. For ease of explanation, a simultaneous dual channel receiver 203 is shown and described which, as previously mentioned, can be extended to greater than two channels, and can incorporate either a DCR configuration, dual conversion configuration (shown) or a combination of both.

Independent LO generators 201 and 202 are used to control first and second LO injections 218 and 228 to dual channel receiver 203. LO generator 201 may include a plurality of Voltage Controlled Oscillators (VCO) as represented by a first VCO to generate a first VCO signal 210 in a first VCO band (VCO Band 1) and a second VCO to generate a second VCO signal 212 in a second VCO Band (VCO Band 2). The VCO signals 210, 212 (from VCO Band 1 and VCO Band 2) are applied to a synthesizer (SYNTH 1) 214 to generate the first injection signal (LO1) 218. Synthesizer 214 generates LO injection outputs across a first desired operating band. The first injection signals (LO1) 218 are applied to a first down-mixer 234 of receiver 203.

The second LO generator 202 may also include a plurality of Voltage Controlled Oscillators (VCO) as represented by a first VCO to generate a first VCO signal 220 in (VCO Band 1) and a second VCO to generate a second VCO signal 222 in (VCO Band 2). The VCO signal 220 from VCO Band 1 and the VCO signal 222 from VCO Band 2 are applied to a second synthesizer (SYNTH 2) 224. The output of synthesizer 224 is filtered via filters 226 to provide LO injection outputs across a second desired operating band to provide the second LO injection signal 228 to a down-mixer 235 of receiver 203.

Again, RF signal 102 is diplexed into its different bands (RF band 1, RF band 2) for simultaneous application to dual channel receiver 203. In operation, the first RF signal 1 from RF band 1 is applied to a first dual output low noise amplifier 230, and RF signal 2 from RF band 2 is applied to a second dual output low noise amplifier 231. Front end splitting and combining is performed with single-pole double-throw (SPDT) switches 232, 233 or other suitable switching technology. As mentioned previously, RF bands 1 and 2 include any two bands across the public safety bands. The front end switches 232, 233 may switch between three conditions. Dual channel receiver 203 may selectively operate under three (3) operating conditions, in which: switches 232 and 233 are set such that the input signals to mixers 234 and 235 are from within a first band, RF band 1; switches 232 and 233 are set such that the input signals to mixers 234 and 235 are from within a second band, RF band 2; or switches 232 and 233 are set such that the input signals to mixers 234 and 235 are from different bands, one from each of RF band 1 and RF band 2.

Under all switch conditions, the output signal from switch 232 (RF1) is applied to mixer 234 to be down converted to a first intermediate frequency (IF) signal (IF 1) by mixing RF 1 with LO1 injection signal 218. The output signal from switch 233 (RF 2) is applied to mixer 235 to be down-converted to generate a second IF signal (IF 2) by mixing RF2 with LO2 injection signal 228. Signal IF 1 may be level controlled at 236 (attenuation or gain) and signal IF2 may be attenuated independently and level controlled at 237 (attenuation or gain). The level control is set by the IF/AGC control 205. Signal IF 1 gets filtered through first bandpass filter (BPF) 238 to generate a first filtered IF 1 and signal IF 2 gets filtered through second bandpass filter (BPF) 239 to generate a second filtered IF 2 signal. The filtered IF 1 signal gets amplified at first amplifier 240 to generate a first amplified IF1 signal and filtered IF 2 signal gets amplified at second amplifier 241 to generate a second amplified IF 2 signal. Amplified IF 1 signal and amplified IF 2 signal are combined at summer 243 to generate a combined intermediate frequency (CIF) signal 242 covering a CIF spectrum incorporating both the first and second amplified signals IF 1 and IF 2 signals respectively.

The first and second IF signals IF 1 and IF 2 that are embedded in CIF signal 242 are spectrally offset so as to provide sufficient isolation and attenuation of undesired interference signals so as to differentiate the first desired information set contained in IF 1 from the second desired information set contained in IF 2.

The CIF contained in signal 242 is then applied to the Analog-to-Digital Conversion (ADC) circuitry 204. A/D conversion system 204 takes the analog CIF signal 242 and converts it to a digital signal 250, referred to as a serial synchronous interface (SSI) signal 250 representing the combined IF signal 242. The analog-to-digital conversion can be applied to both DCR and dual conversion receivers. For a direct conversion application, the CIF signal 242 is sampled, for example, at ADC 245 at a sample rate proportional to clock synthesizer 249 so as to produce a digitized sampled signal. This sampled signal at the output of ADC 245 is then divided down via decimation filter (DEC FILTER) 247, and may be processed by other digital blocks (not shown) to produce the digital signal 250 representing a sampled received signal of the combined spectrum at IF.

Alternatively, for dual conversion applications, the receiver 104 further includes additional amplifier 244, mixer 246, and another LO synthesizer (LO SYNTH) 248. The bandwidth of IF spectrum applied to amplifier 244 is selected such that the combined spectrum of IF 1 and IF 2 (including spectral offset separation) is acquired. For the dual conversion application, the CIF signal 242 is mixed at mixer 246 with a synthesized LO signal from LO synthesizer 248 to produce a secondary IF signal. This secondary IF signal is sampled (in accordance with the sampling rate of clocked synthesizer (CLK SYNTH) 249) to produce a digital signal which is then decimated through decimation filter 247 to produce the digital signal 250 in the form of a serial synchronous signal of combined spectrum at IF. Alternatively, IF 1 and IF 2 signals can be applied to ADC system block 204 as separate signals into two separate amplifier and mixer blocks, such as 244 and 246 and summer 243 can be moved so as to sum the outputs of the mixers prior to digitally sampled at ADC 245. Both direct conversion and dual conversion embodiments use CLK SYNTH 249 and decimation filter 247; however, the sample rate as set by CLK SYNTH 249 and the decimation rate at block 247 may be different for the DCR or dual conversion topologies.

At Digital Signal Processing (DSP) block 205, the sampled composite IF signal is first processed so as to generate a plurality of individual sampled received signals for each received signal being processed by receiver 104. The generation of individual sampled received signals representing IF 1 and IF 2 generally includes processing at bandpass filter (BPF) blocks 253 and 254 respectively. Each BPF block produces a filtered, independently sampled (samples rates for BPF 253 and 254 may be different) received signal representing only one of the received signals being simultaneously processed by receiver 104. Intermediate frequency AGC control blocks (AGC PROCESS) 255 and 256 subsequently process each of the sampled received signals from BPF 253 and 254 respectively, so as to provide digital control signals 259 and 260 which are proportional to the amplitude of the first and second desired IF signals IF 1 and IF 2 respectively. The digital control signals 259 and 260 are proportional to a calculated estimate of the received signal strength (RSS) for each desired received signal contained in the CIF signal 242. This means that a separate, independently calculated RSS value is calculated for each of the received signals IF 1 and IF 2 being processed by receiver 104.

In addition to the on channel RSS blocks for IF 1 and IF2, a second set of bandpass filters (BPF) for IF 1 and IF 2 273 and 274, each having a wider passband response than its companion BPF 253 and 254 respectively, allow additional spectrum proximate to signals IF 1 and IF 2, including undesired adjacent channel interference signals. The BW for BPF 273 is directly proportional to the BW of BPF 253, and the BW of BPF 274 is directly proportional to BW of BPF 254. Two more digital control signals 275 and 276 proportional to the received signal strength of the desired signals IF 1 and IF 2 and undesired signals proximate to IF 1 and IF 2 are provided to the IF AGC control blocks 255 and 256 respectively. The IF AGC control blocks infer from the absence of a strong desired on-channel signal in 255 and/or 256 plus the presence of a strong signal in 275 and/or 276 that a strong interfere signal is present for IF 1 and/or IF 2 respectively. When only a strong interferer is present in one IF path, maximal attenuation can be engaged to optimize performance in the other IF path.

Subsequent to simultaneously processing the sampled received signals at AGC control blocks 255 and 256, the received signals may be processed by any other digital processing as may be required to support a particular radio application, including tandem demodulation of the received signals at demodulator blocks 257 and 258. The IF/AGC control 205 may be part of a DSP which generates control signals 259 and 260 that in turn control Digital-to-Analog converters (DAC) 263 and 261 so as to independently adjust IF gain or attenuation at blocks 236 and 237 respectively. The AGC system is optimized to maintain signal to noise ratio (SNR) of a plurality of desired received signal incorporated into the CIF signal 242.

Accordingly, DSP 205 incorporates a first path 251 including BPF filter 253, AGC thresholding block 255 and demodulator (DEMOD) 257 and a second path 252 including BPF filter 254, AGC thresholding block 256, and demodulator (DEMOD) 258. First path 251 filters at 253 the digital signal 250 so as to provide a sampled signal representing received signal IF 1 and then calculates, via received signal strength indicator (RSSI) function contained in block 255, a RSSI proportional to the received signal power for the first channel (CH 1). The sampled signal representing received signal IF 1 is demodulated at demodulator 257 into a baseband signal and may be further processed as appropriate for supporting a first application communicating a first information sequence to the end user. Second path 252 filters the digital signal 250 to provide a sampled signal representing received signal IF 2 and then calculates, via RSSI function contained in block 256, a RSSI proportional to the received signal power for the second channel (CH 2). The sampled signal representing received signal IF 2 signal is demodulated at demodulator 258 into baseband and may be further processed as appropriate for supporting a second application communicating a second information sequence to the end user. The IF AGC control blocks 255 and 256 thus maintain SNR along signal paths 251, 252 back to the respective level controls 236 and 237 of dual channel receiver 203. Thus, the attenuation of dual channel receiver 203 is set by the IF AGC control blocks 255 and 256. The proper AGC action provided by DSP 205 prevents the near-far limitations associated with previous receivers. Importantly, optimal SNR of the IF signals relies on separate AGC control, and may also incorporate other control systems not shown, such as independent automatic frequency control (AFC), and independent on-channel carrier detect (CD) for signals IF 1 and IF 2 respectively.

Figure 3:
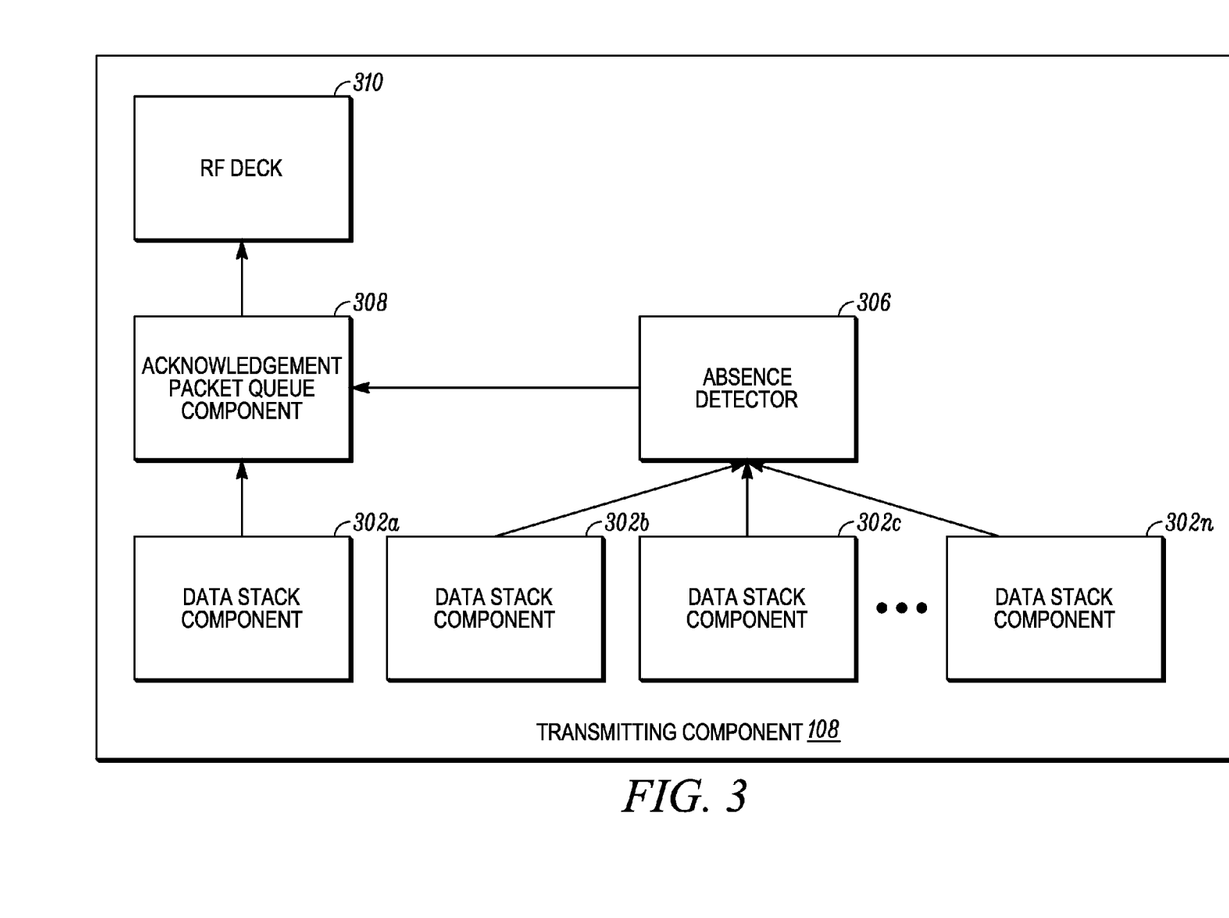
FIG. 3 is a block diagram of a transmitter device used in accordance with some embodiments.

FIG. 3 is a block diagram of transmitting component 108 used in accordance with some embodiments. Transmitting component 108 is configured to transmit information on one channel, according to a first protocol, without affecting reception of voice and data messages on other channels that are received according to one or more protocol(s). Transmitting component 108 includes data stack components 302a-302n, an absence detector 306, an acknowledgement (ACK) packet queue component 308 and a radio frequency (RF) deck 310.

In some embodiments, each of data stack components 302a-302n may be used to store voice or data messages for a specific protocol, for example, TETRA, APCO (phase 1 (P1) or phase 2 (P2), conventional or trunked, control or traffic), P25, analog FM, Securenet, DMR, HPS/HSD, SRW, LTE and/or other legacy cellular protocols. For example, data stack component 302a may be used to store voice or data messages being transmitted from device 100 according to the APCO P25 protocol, data stack component 302b may be used to store voice or data messages being transmitted from device 100 according to the TETRA protocol, and data stack component 304c may be used to store voice or data messages being transmitted from device 100 according another protocol. In other embodiments, each data stack component 302 may be used to store voice or data messages being transmitted from device 100 according to one or more protocols.

Absence detector 306 is configured to identify time periods (time windows) where reception may be blocked for one or more data stack components, for example, data stack components 302b-302n. In other words, absence detector 306 is configured to identify time periods when, for example, in some cases, data stack components 302b-302n cannot receive voice and data messages or in other cases, known voice/data messages are missing on data stack components 302b-302n but absence detector 306 determines that the missing information can be safely missed. ACK packet queue component 308 queues information transmitted, according to a specific protocol, from one or more data stack components. For example, ACK packet queue component 308 may queue information transmitted, according to the APCO protocol, from data stack component 302a. ACK packet queue component 308 ensures that the status symbols are properly inserted into the bursts. RF deck 310 handles transmission of voice and data messages over the RF link.

Consider the following example where APCO data packet (s) with confirmed delivery are received on one channel and data and voice messages are received, according to one of a plurality of other protocols, on the another channel in a communication device. Responsive to receiving confirmed delivery APCO data packet(s), data stack component 302a, that is, for example, configured to store voice or data messages being transmitted from device 100 according to the APCO protocol, will attempt to transmit acknowledgement(s) to acknowledge receipt of the confirmed data packets. ACK packet queue component 308 may intercept the acknowledgement transmission(s) and queue them, making adjustments for status symbol location as necessary. In parallel, absence detector 306 may monitor the data stack components 302b-302n for transmit opportunities. When a transmit opportunity is detected, i.e., when one or more of data stack components 302b-302n is not receiving voice and data messages or when absence detector 306 determines that the missing information on one or more of data stack components 302b-302n can be safely missed, absence detector 306 notifies ACK packet queue component 308. In an embodiment, absence detector 306 provides the duration of a determined transmit opportunity and ACK packet queue component 308 immediately sends an optimal number of acknowledgement packets to RF deck 310 for RF deck 310 to transmit the acknowledgment packets within the duration of the transmit opportunity. In other embodiments, absence detector 306 may provide a continuous indication and the acknowledgement packets may be transmitted one at a time, or in some other sequence, from ACK packet queue component 308 to RF deck 310 for RF deck 310 to transmit the acknowledgment packets, until the indication is turned off RF Deck 310 transmit timing may be controlled by data stack component 302a to ensure transmissions are aligned on the proper micro-slot boundaries.

In some embodiments, a new signaling packet is provided to send acknowledgments for receipt of multiple packets at once. In conjunction with allowing acknowledgements of more than one packet at a time, this allows the downlink channel to send the new signaling packet even though the uplink channel is busy. Some embodiments also allow for a new retry packet to allow for selective retry requests for multiple packets at once.

Absence detector 306 may be able to identify the transmit opportunity using features for specific protocols. For example, absence detector 306 may use loss of carrier to identify transmit opportunities. For trunking or conventional voice (for example, for APCO P1, APCO P2, DMR, Analog, Securenet) absence detector 306 may use, for example, silence detection to identify transmit opportunities. For trunking or conventional data or voice, absence detector 306 may identify user hang time or switching to identify transmit opportunities. For APCO P2 (trunking, voice or conventional), absence detector 306 may use off slots to identify transmit opportunities. For an APCO P1 trunking control channel, absence detector 306 may use Trunked Signaling Block (TSBK) triple prediction to identify transmit opportunities. For HPD/HSD protocol, absence detector 306 may use negotiated absence to identify transmit opportunities. For TETRA, absence detector 306 may use energy economy to identify transmit opportunities. For SRW protocol, absence detector 306 may use a sleep/wake up function to identify transmit opportunities or absence detector 306 may use a receive-only operation to identify transmit opportunities. For LTE or commercial cellular protocol, absence detector 306 may use sleep modes to identify transmit opportunities. The above examples are not exhaustive and absence detector 306 may use other features not outlined above to identify transmit opportunities.

Figure 4:
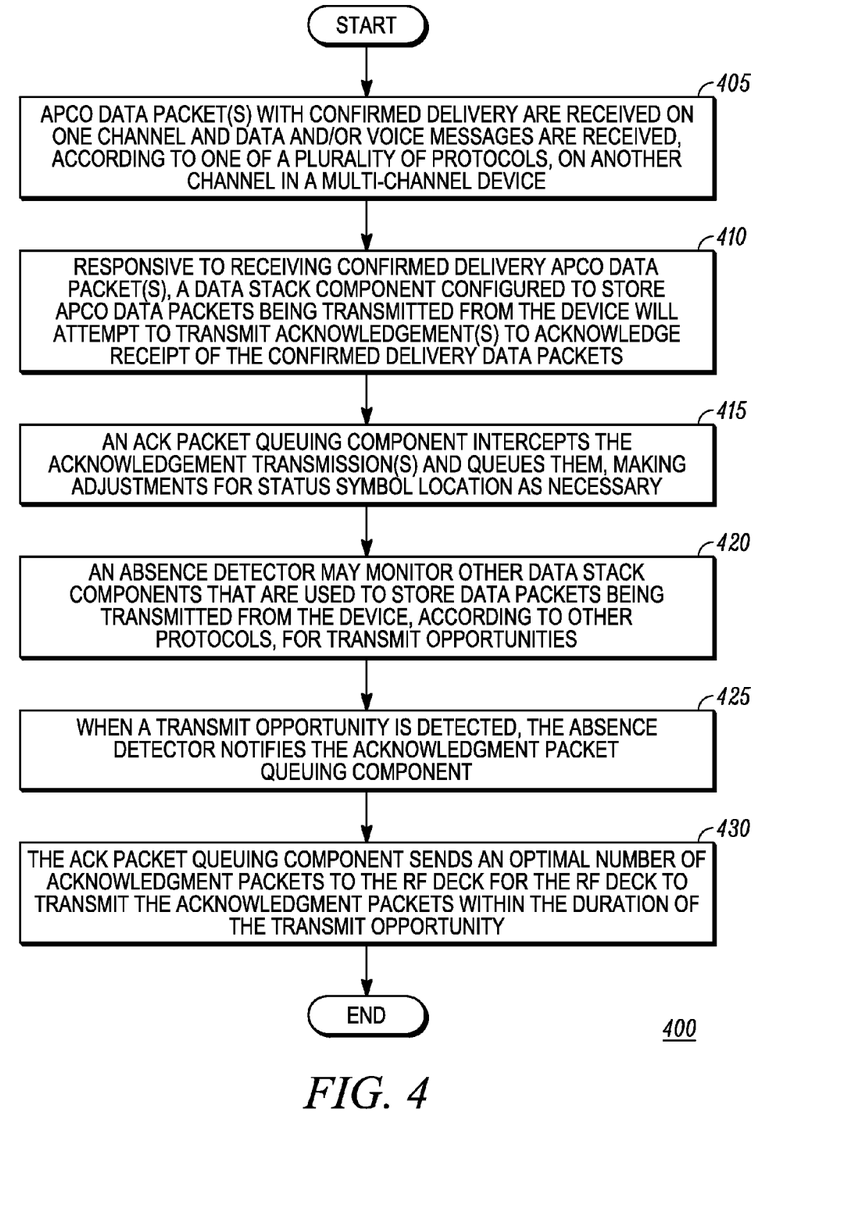
FIG. 4 is another flow diagram illustrating a method for transmitting information on one channel with affecting reception on other channel(s) in a multichannel receiver in accordance with some embodiments.

FIG. 4 is a flow diagram illustrating a method 400 of transmitting on one channel without affecting reception on another channel in a multi-channel receiver in accordance with some embodiments. At 405, APCO data packet(s) with confirmed delivery are received on one channel and data and/or voice messages are received, according to one of a plurality of protocols, on the other channel in a multi-channel device. At 410, responsive to receiving confirmed delivery APCO data packet(s), a data stack component configured to store APCO data packets being transmitted from the device will attempt to transmit acknowledgement(s) to acknowledge receipt of the confirmed delivery data packets. At 415, an ACK packet queuing component intercepts the acknowledgement transmission(s) and queues them, making adjustments for status symbol location as necessary. At 420, an absence detector may monitor other data stack components that are used to store data packets being transmitted from the device, according to other protocols, for transmit opportunities. At 425, when a transmit opportunity is detected, the absence detector notifies the ACK packet queuing component. At 430, the ACK packet queuing component sends an optimal number of acknowledgment packets to the RF deck for the RF deck to transmit the acknowledgment packets within the duration of the transmit opportunity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. For example, one or more components in device 100 of FIG. 1 may comprise a set of instructions (perhaps stored in a volatile or non-volatile computer readable medium) that, when executed by a processor, perform some or all of the steps set forth in FIG. 4 and corresponding text. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method comprising:
simultaneously receiving incoming messages on at least two channels in a multi-channel device, wherein a first incoming message is received according to a first protocol on a first channel of the at least two channels; and responsive to receiving the first incoming message, transmitting outgoing messages on the first channel while simultaneously receiving the incoming messages according to a second protocol on a second channel of the at least two channels, wherein the transmitting comprises:
   queuing the outgoing messages to be sent according to the first protocol;
   monitoring at least one data stack that is used for at least receiving messages according to the second protocol for transmit opportunities; and
   responsive to detecting a transmit opportunity, via the monitoring, transmitting an optimal number of the outgoing messages within the duration of the transmit opportunity,
   wherein the outgoing messages are transmitted on the first channel within the duration of the transmit opportunity in order to not affect incoming messages received on the second channel.

2. The method of claim 1, wherein the outgoing messages transmitted on the first channel are acknowledgement messages being transmitted in response to first incoming messages.

3. The method of claim 1, wherein the queuing comprises intercepting the outgoing messages and making adjustments for a status symbol location in the outgoing messages.

4. The method of claim 1, wherein the transmit opportunity is detected when the at least one data stack is not receiving a message according to the second protocol.

5. The method of claim 1, wherein the monitoring comprises sending a notification upon detecting the transmit opportunity, wherein the notification provides a duration of the transmit opportunity.

6. The method of claim 1, wherein the monitoring comprises sending a notification upon detecting the transmit opportunity, wherein the notification provides a continuous indication of the transmit opportunity and the outgoing message is sent in a sequence when the continuous indication is turned on.

7. The method of claim 1, wherein the outgoing message includes a signaling packet configured to send acknowledgements for receipt of multiple packets at once.

8. The method of claim 1, wherein the outgoing message includes a retry packet that further includes selective retry requests for multiple packets at once.

9. A multi-channel device comprising:
   a receiver configured to simultaneously receive incoming messages on at least two channels in the multi-channel device, wherein a first incoming message is received according to a first protocol on a first channel of the at least two channels; and
   a transmitter configured to transmit an outgoing message on the first channel, responsive to receiving the first incoming message, wherein outgoing messages are transmitted while simultaneously receiving the incoming messages according to a second protocol on a second channel of the at least two channels, the transmitter comprising:
     a queuing component configured to queue the outgoing messages to be sent according to the first protocol;
     a monitoring component configured to monitor at least one data stack for transmit opportunities on the first channel according to the first opportunity, wherein the at least one data stack is used for at least receiving messages according to the second protocol; and
     a transmitting deck configured to transmit, responsive to detecting a transmit opportunity, via the monitoring component, an optimal number of the outgoing messages within the duration of the transmit opportunity,
     wherein the outgoing messages are transmitted on the first channel within the duration of the transmit opportunity in order to not affect the incoming messages received on the second channel.

10. The device of claim 9, wherein the transmitter further comprises a first data stack that is configured to transmit the outgoing messages on the first channel as acknowledgement messages in response to the incoming messages received on the first channel.

11. The device of claim 9, wherein the queuing component is configured to intercept the outgoing messages sent from a first data stack, wherein the outgoing messages sent from the first data stack are acknowledgement messages in response to the incoming messages received on the first channel, and
   wherein the queuing component is configured to make adjustments for a status symbol location in the outgoing messages.

12. The device of claim 9, wherein the monitoring component is configured to detect the transmit opportunity when the at least one data stack is not receiving a message according to the second protocol.

13. The device of claim 9, wherein the monitoring component is configured to send a notification upon detecting the transmit opportunity, wherein the notification provides a duration of the transmit opportunity.

14. The device of claim 9, wherein the monitoring component is configured to send a notification upon detecting the transmit opportunity, wherein the notification provides a continuous indication of the transmit opportunity and the outgoing messages are sent in a sequence when the continuous indication is turned on.

15. The device of claim 9, wherein the monitoring component is configured to identify the transmit opportunity using a feature of the second protocol.

16. The device of claim 9, wherein the outgoing message includes a signaling packet configured to send acknowledgements for receipt of multiple packets at once.

17. The device of claim 9, wherein an outgoing message includes a retry packet that further includes selective retry requests for multiple packets at once.

18. A transmitter device configured to:
   transmit an outgoing message on a first channel of at least two channels in a multi-channel device, wherein a first incoming message is received by the multi-channel device on the first channel according to a first protocol and the outgoing message is sent responsive to receiving the first incoming message, wherein outgoing messages are transmitted while the multi-channel device is simultaneously receiving incoming messages according to a second protocol on a second channel of the at least two channels, the transmitter comprising:
     a queuing component configured to queue the outgoing messages to be sent according to the first protocol;
     a monitoring component configured to monitor at least one data stack for transmit opportunities on the first channel according to the first protocol, wherein the at least one data stack is used for at least receiving messages according to the second protocol; and
     a transmitting deck configured to transmit, responsive to detecting a transmit opportunity, via the monitoring component, an optimal number of the outgoing messages within the duration of the transmit opportunity,
     wherein the outgoing messages are transmitted on the first channel within the duration of the transmit opportunity in order to not affect incoming messages received on the second channel.

19. The transmitter of claim 18, further comprising a first data stack that is configured to transmit the outgoing messages on the first channel as acknowledgement messages in response to the incoming messages received on the first channel.

* * * * *